United States Patent
Jiao et al.

(10) Patent No.: US 11,621,808 B1
(45) Date of Patent: Apr. 4, 2023

(54) MACHINE LEARNING BASED METHODOLOGY FOR SIGNAL WAVEFORM, EYE DIAGRAM, AND BIT ERROR RATE (BER) BATHTUB PREDICTION

(71) Applicant: Xilinx, Inc., San Jose, CA (US)

(72) Inventors: Shuo Jiao, Sunnyvale, CA (US); Romi Mayder, Monte Sereno, CA (US); Bowen Li, Cary, NC (US)

(73) Assignee: XILINX, INC., San Jose, CA (US)

( * ) Notice: Subject to any disclaimer, the term of this patent is extended or adjusted under 35 U.S.C. 154(b) by 688 days.

(21) Appl. No.: 16/654,460

(22) Filed: Oct. 16, 2019

(51) Int. Cl.
| | |
|---|---|
| G06N 3/08 | (2006.01) |
| H04L 43/08 | (2022.01) |
| H04L 1/24 | (2006.01) |
| G06N 3/086 | (2023.01) |
| H04L 1/20 | (2006.01) |
| H04L 43/0823 | (2022.01) |

(52) U.S. Cl.
CPC .............. H04L 1/245 (2013.01); G06N 3/08 (2013.01); G06N 3/086 (2013.01); H04L 1/203 (2013.01); H04L 43/0847 (2013.01)

(58) Field of Classification Search
CPC ............. G06N 3/08; G06N 3/082; G06N 3/04
See application file for complete search history.

(56) References Cited

U.S. PATENT DOCUMENTS

| | | | |
|---|---|---|---|
| 9,444,588 B1 * | 9/2016 | Katic | ................ H04L 25/03057 |
| 10,192,016 B2 | 1/2019 | Ng et al. | |
| 10,402,726 B1 * | 9/2019 | Moore | ................ G06F 3/04842 |

(Continued)

FOREIGN PATENT DOCUMENTS

CN 109252009 A * 1/2019

OTHER PUBLICATIONS

Woo, Ju-ho, Joo-Yeop Song, and Young-June Choi. "Performance enhancement of deep neural network using feature selection and preprocessing for intrusion detection." 2019 International Conference on Artificial Intelligence in Information and Communication (ICAIIC). IEEE, 2019. (Year: 2019).*

(Continued)

*Primary Examiner* — Hal Schnee
(74) *Attorney, Agent, or Firm* — Patterson + Sheridan, LLP

(57) ABSTRACT

Apparatus and associated methods relate to predicting various transient output waveforms at a receiver's output after an initial neural network model is trained by a receiver's transient input waveform and a corresponding transient output waveform. In an illustrative example, the machine learning model may include an adaptive-ordered auto-regressive moving average external input based on neural networks (NNARMAX) model designed to mimic the performance of a continuous time linear equalization (CTLE) mode of the receiver. A Pearson Correlation Coefficient (PCC) score may be determined to select numbers of previous inputs and previous outputs to be used in the neural network model. In other examples, corresponding bathtub characterizations and eye diagrams may be extracted from the predicted transient output waveforms. Providing a machine learning model may, for example, advantageously predict various data patterns without knowing features or parameters of the receiver or related channels.

20 Claims, 10 Drawing Sheets

(56) References Cited

U.S. PATENT DOCUMENTS

| | | | |
|---|---|---|---|
| 2019/0080223 A1 | 3/2019 | Fraser et al. | |
| 2019/0114533 A1 | 4/2019 | Ng et al. | |
| 2019/0188531 A1* | 6/2019 | Ozcaglar | G06K 9/6219 |
| 2020/0184328 A1* | 6/2020 | Delerse | G06N 3/08 |
| 2020/0285984 A1* | 9/2020 | Bejjam | G06N 5/04 |
| 2021/0271789 A1* | 9/2021 | Hein | G06F 30/17 |

OTHER PUBLICATIONS

Ambasana, Nikita, et al. "S-parameter and frequency identification method for ANN-based eye-height/width prediction." IEEE Transactions on Components, Packaging and Manufacturing Technology 7.5 (2017): 698-709. (Year: 2017).*

Xiao, Kai, Beomtaek Lee, and Xiaoning Ye. "A flexible and efficient bit error rate simulation method for high-speed differential link analysis using time-domain interpolation and superposition." 2008 IEEE International Symposium on Electromagnetic Compatibility. IEEE, 2008. (Year: 2008).*

Machine translation of CN-109252009-A (Year: 2018).*

Jeff Fifield, The Future of Machine Learning Acceleration, Xilinx Labs, retrieved online from <https://www.xilinx.com/publications/events/machine-learning-live/colorado/HotChipsOverview.pdf>, Nov. 2018, 47 pages, US.

Stephen A. Billings, Daniel Coca, Identification of NARMAX and related Models, Control systems, Robotics and Automation, vol. V, retrieved online from <https://pdfs.semanticscholar.org/c299/f82f863ab7f3ac673ad4132610becfdc65e0.pdf> on Sep. 2019, 10 pages, UK.

Yang Gao, Meng Joo Er, NARMAX-Model-Based Time Series Modeling and Prediction: Feedforward and Recurrent Fuzzy Neural Network Approaches, retrieved online from <https://pdfs.semanticscholar.org/332b/4447622d62c4143cacf6f3fcd013e4c64b8c.pdf> on Sep. 2019, 23 pages, Singapore.

Wikipedia, Nonlinear system identification, retrieved online from <https://en.wikipedia.org/wiki/Nonlinear_system_identificatio> on Sep. 2019, 6 pages.

Hua Liang Wei, Narmax Model and Its Application to Forecasting Geomagnetic Indices, retrieved online from <https://ssg.group.shef.ac.uk/progress/dissemination/summer_school_NARMAX_Model.pdf> on Sep. 2019, 24 pages, Sheffield, UK.

Bowen Li, Paul Franzon, Yongjin Choi, Christopher CHENG,Receiver Behavior Modeling based on System Identification, IEEE, 2018, p. 299-301,3 pages, US.

Francisco Elias Rangel Patino, Jose Ernesto Rayas Sanchez, Andres Viveros Wacher, Jose Luis Chavez Hurtado, Edgar Andrei Veda Ochoa, Nagib Hakim, Post-Silicon Receiver Equalization Metamodeling by Artificial Neural Networks, IEEE Transactions on Computer-Aided Design of Integrated Circuits and Systems, vol. 38, No. 4, Apr. 2019, p. 733-740, 8 pages.

Tianjian Lu, Ken Wu, Machine Learning Methods in High-Speed Channel Modeling, DesignCon 2019, retrieve online from <https://schedule.designcon.com/session/machine-learning-methods-in-high-speed-channel-modeling/859113> on Sep. 2019, 15 pages.

Alex Manukovsky, Zurab Khasidashvili, Adam J Norman, Yaron Juniman, Roee Bloch,Machine Learning Applications for Simulation and Modeling of 56 and 112 Gb SerDes Systems, DesignCon 2019,retrieve online from <https://schedule.designcon.com/session/machine-learning-applications-for-simulation-modeling-of-56-112-gb-serdes-systems/859764> on Sep. 2019, 25 pages.

* cited by examiner

MACHINE LEARNING BASED METHODOLOGY FOR SIGNAL WAVEFORM, EYE DIAGRAM, AND BIT ERROR RATE (BER) BATHTUB PREDICTION

TECHNICAL FIELD

Various embodiments relate generally to integrated circuits (ICs) and, more particularly, to machine learning based modeling method to predict data patterns.

BACKGROUND

Machine learning is the science of inducing computing systems to act without being explicitly programmed. Classical machine learning includes various clustering and classification techniques, including K-means clustering, linear and logistic regressions, stochastic gradient descent, association rule learning, and the like. Deep learning is a newer frontier in machine learning. Deep learning is a class of machine learning algorithms that uses multiple layers of nonlinear processing units for feature extraction and transformation. Deep learning algorithms can be unsupervised (e.g., pattern analysis) or supervised (e.g., classification). The deep learning algorithm can be implemented using layers of an artificial neural network (ANN) (referred to herein as a "neural network").

In general, a neural network is a collection of nodes (i.e., the "neurons") that are connected in a graph. A node in a neural network computes a sum of weighted inputs and adds an optional bias to the sum. The output of the node is a function of the final sum (referred to as an "activation function"). Example activation functions include the sigmoid function, the hyperbolic tangent (tan h) function, the Rectified Linear Unit (ReLU) function, and the identity function. Neural network models are often organized into layers of nodes, which define a specific topology, and corresponding weights and biases. The weights and biases are referred to as network parameters.

SUMMARY

Apparatus and associated methods relate to predicting various transient output waveforms at a receiver's output after a neural network model is trained by a receiver's transient input waveform and a corresponding transient output waveform. In an illustrative example, a machine learning model may include an adaptive-ordered auto-regressive moving average external input based on neural networks (NNARMAX) model designed to mimic the performance of a continuous time linear equalization (CTLE) mode of the receiver. A Pearson Correlation Coefficient (PCC) score may be determined to select numbers of previous inputs and previous outputs to be used in the neural network model. In other examples, corresponding bathtub characterizations and eye diagrams may be extracted from the predicted transient output waveforms. Providing a machine learning model may, for example, advantageously predict various data patterns without knowing features or parameters of the receiver or related channels.

Various embodiments may achieve one or more advantages. For example, some embodiments may provide a fast and high prediction accuracy of transient waveforms at the receiver's output. In some embodiments, the model may be trained only once and used to predict over various channels while preserving substantial accuracy, which may advantageously reduce the complexity of the black-box modeling system and reduce the training time of the model. Some embodiments may provide a high simulation (prediction) speed. For example, some embodiments may predict one million bits within 10 seconds. Some embodiments may predict eye diagrams and bit error rate (BER) bathtub curves with high correlation with the actual eye diagrams and the actual BER bathtub curves. Some embodiments may provide a black-box modeling system that provides high and stable prediction accuracy on any data pattern, no accuracy variation over various data patterns. In some embodiments, the modeling method may be applied to both pre-silicon circuit modeling and post-silicon validation on-die measurement.

In one exemplary aspect, a system includes a processing engine and a data store coupled to the processing engine. The data store contains a program of instructions that, when executed by the processing engine, cause the processing engine to perform operations to predict a data pattern at a receiver's output, the operations includes (a) retrieving, by the processing engine, a set of training data patterns from the data store, (b) generating, by the processing engine, a model order of the neural network model in response to a Pearson Correlation Coefficient simulation result, (c) applying the model order to an initial neural network model and training the model in response to the set of training data patterns to obtain parameters used in the neural network model, the trained neural network model is used to predict a data pattern at the receiver's output in response to a test data pattern to be received at the receiver's input, (d) retrieving, by the processing engine, a test data pattern from the data store, and, (e) processing, by the trained neural network model, the retrieved test data pattern to generate a corresponding predicted data pattern.

In some embodiments, the operations may also include (f) selecting a first Pearson Correlation Coefficient (PCC) score to determine numbers of previous inputs to be used in the initial neural network model and selecting a second PCC score to determine numbers of previous outputs to be used in the initial neural network model. In some embodiments, the neural network model may include an adaptive-ordered auto-regressive moving average external input based on neural networks (NNARMAX) model. In some embodiments, the operations may also include (g) selecting a first Pearson Correlation Coefficient (PCC) score to determine numbers of previous inputs to be used in the NNARMAX model and selecting a second PCC score to determine numbers of previous outputs to be used in the NNARMAX model.

In some embodiments, the operations may also include (h) extracting, by the processing engine, bit error rate (BER) bathtub characterizations from the predicted data pattern at the receiver's output. In some embodiments, the operations may also include (i) extracting, by the processing engine, eye diagram characterizations from the predicted data pattern at the receiver's output. In some embodiments, the eye diagram characterizations may include eye height and eye width of an eye diagram. In some embodiments, the set of training data patterns may include a first transient waveform received at the receiver's input and a second transient waveform generated at the receiver's output.

In another exemplary aspect, a method includes (a) providing an initial neural network model, (b) performing a Pearson Correlation Coefficient simulation on a set of training data patterns to generate a model order of the initial neural network model, (c) applying the model order to the initial neural network model and training the model in response to the set of training data patterns to obtain parameters used in the neural network model, the trained neural network model is used to predict data pattern at the receiver's output, (d) providing a test data pattern, and, (e) processing, by the trained neural network model, the test data pattern to obtain a corresponding predicted data pattern at the receiver's output.

In some embodiments, the method may also include (f) selecting a first Pearson Correlation Coefficient (PCC) score to determine numbers of previous inputs to be used in the initial neural network model and selecting a second PCC score to determine numbers of previous outputs to be used in the initial neural network model. In some embodiments, the method may also include (g) extracting, by the processing engine, eye diagram characterizations from the predicted data pattern at the receiver's output. In some embodiments, the eye diagram characterizations comprises eye height and eye width of an eye diagram.

In some embodiments, the method may also include (h) extracting, by the processing engine, bit error rate (BER) bathtub characterizations from the predicted data pattern at the receiver's output. In some embodiments, the set of training data patterns comprises a first transient waveform received by the receiver and a corresponding second transient waveform generated by the receiver. In some embodiments, the initial neural network model comprises an adaptive-ordered auto-regressive moving average external input based on neural networks (NNARMAX) model.

In another exemplary aspect, a system includes (a) a first circuit configured to receive a first signal and a second signal to generate a third signal, the first signal comprises a signal received by a receiver, and the second signal comprises a signal generated by the receiver in response to the first signal, and (b) a second circuit, which comprises a sub circuit implementing a neural network model, configured to receive the first signal and the third signal to generate a trained neural network model, the second circuit is further configured to receive and apply a fourth signal to the trained neural network model to generate a fifth signal, the fifth signal comprises a predicted signal at the receiver's output in response to the fourth signal to be received by the receiver, the third signal includes a model order to be used by the neural network model in the second circuit.

In some embodiments, the first circuit may include a circuit configured to implement Pearson Correlation Coefficient (PCC) algorithm to generate the third signal. In some embodiments, the neural network model may include an auto-regressive moving average external input based on neural network (NNARMAX) model. In some embodiments, the first signal and the second signal may be extracted from on-die measurements. In some embodiments, the fourth signal may be extracted from on-die measurements.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Apparatus and associated methods relate to predicting various transient output waveforms at a receiver's output after a neural network model is trained by a receiver's transient input waveform and a corresponding transient output waveform. In an illustrative example, the machine learning model may include an adaptive-ordered auto-regressive moving average external input based on neural networks (NNARMAX) model designed to mimic the performance of a continuous time linear equalization (CTLE) mode of the receiver. A Pearson Correlation Coefficient (PCC) score may be determined to select numbers of previous inputs and previous outputs to be used in the neural network model. In other examples, corresponding bathtub characterizations and eye diagrams may be extracted from the predicted transient output waveforms. Providing a machine learning model may, for example, advantageously predict various data patterns without knowing features or parameters of the receiver or related channels.

To aid understanding, this document is organized as follows. First, an exemplary platform (e.g., an FPGA) suitable to perform data communication is briefly introduced with reference to FIG. 1. Second, with reference to FIGS. 2A-3, the discussion turns to exemplary embodiments that illustrate machine learning systems with software-implemented machine learning engine and hardware-implemented machine learning engine. Third, with reference to FIGS. 4A-4B, exemplary methods to generate the machine learning model and perform output transient waveform predictions are discussed. Then, with reference to FIGS. 5-7B, further explanatory discussion and simulation data are presented to explain several advantages of using the machine learning system. Finally, with reference to FIG. 8, another exemplary platform (e.g., a system-on-Chip (SOC)) suitable to perform data communication and waveform prediction is briefly introduced.

Figure 1:
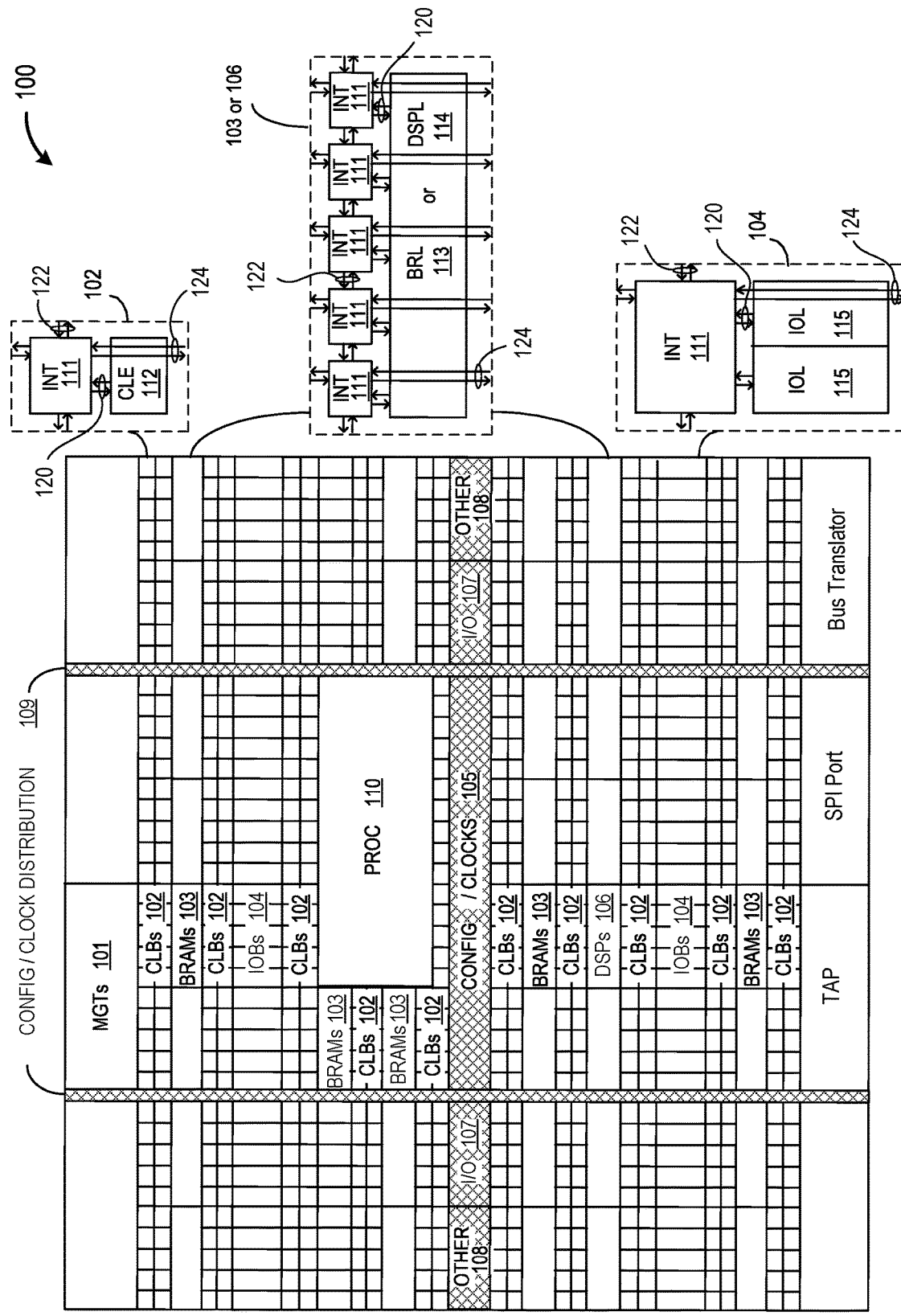
FIG. 1 depicts an exemplary programmable integrated circuit (IC) on which the disclosed circuits and processes may be implemented.

FIG. 1 depicts an exemplary programmable integrated circuit (IC) on which the disclosed circuits and processes may be implemented. A programmable IC 100 includes FPGA logic. The programmable IC 100 may be implemented with various programmable resources and may be referred to as a System on Chip (SOC). Various examples of FPGA logic may include several diverse types of programmable logic blocks in an array.

For example, FIG. 1 illustrates a programmable IC 100 that includes a large number of different programmable tiles including multi-gigabit transceivers (MGTs) 101, configurable logic blocks (CLBs) 102, blocks of random access memory (BRAMs) 103, input/output blocks (IOBs) 104, configuration and clocking logic (CONFIG/CLOCKS) 105, digital signal processing blocks (DSPs) 106, specialized input/output blocks (I/O) 107 (e.g., clock ports), and other programmable logic 108 (e.g., digital clock managers, analog-to-digital converters, system monitoring logic). The programmable IC 100 includes dedicated processor blocks (PROC) 110. The programmable IC 100 may include internal and external reconfiguration ports (not shown).

In various examples, a serializer/deserializer may be implemented using the MGTs 101. The MGTs 101 may include various data serializers and deserializers. Data serializers may include various multiplexer implementations. Data deserializers may include various demultiplexer implementations.

In some examples of FPGA logic, each programmable tile includes a programmable interconnect element (INT) 111 having standardized inter-connections 124 to and from a corresponding interconnect element in each adjacent tile. Therefore, the programmable interconnect elements taken together implement the programmable interconnect structure for the illustrated FPGA logic. The programmable interconnect element INT 111 includes the intra-connections 120 to and from the programmable logic element within the same tile, as shown by the examples included in FIG. 1. The programmable interconnect element INT 111 includes the inter-INT-connections 122 to and from the programmable interconnect element INT 111 within the same tile, as shown by the examples included in FIG. 1.

For example, a CLB 102 may include a configurable logic element (CLE) 112 that may be programmed to implement user logic, plus a single programmable interconnect element INT 111. A BRAM 103 may include a BRAM logic element (BRL) 113 and one or more programmable interconnect elements. In some examples, the number of interconnect elements included in a tile may depend on the height of the tile. In the pictured implementation, a BRAM tile has the same height as five CLBs, but other numbers (e.g., four) may also be used. A DSP tile 106 may include a DSP logic element (DSPL) 114 and one or more programmable interconnect elements. An 1OB 104 may include, for example, two instances of an input/output logic element (IOL) 115 and one instance of the programmable interconnect element INT 111. The actual I/O bond pads connected, for example, to the I/O logic element 115, may be manufactured using metal layered above the various illustrated logic blocks, and may not be confined to the area of the input/output logic element 115.

In the pictured implementation, a columnar area near the center of the die (shown shaded in FIG. 1) is used for configuration, clock, and other control logic. Horizontal areas 109 extending from the column distribute the clocks and configuration signals across the breadth of the programmable IC 100. Note that the references to "columnar" and "horizontal" areas are relative to viewing the drawing in a portrait orientation.

Some programmable ICs utilizing the architecture illustrated in FIG. 1 may include additional logic blocks that disrupt the regular columnar structure making up a large part of the programmable IC. The additional logic blocks may be programmable blocks and/or dedicated logic. For example, the processor block PROC 110 shown in FIG. 1 spans several columns of CLBs 102 and BRAMs 103.

FIG. 1 illustrates an exemplary programmable IC architecture. The numbers of logic blocks in a column, the relative widths of the columns, the number and order of columns, the types of logic blocks included in the columns, the relative sizes of the logic blocks, and the interconnect/logic implementations are provided purely as examples. For example, in an actual programmable IC, more than one adjacent column of CLBs 102 may be included wherever the CLBs 102 appear, to facilitate the efficient implementation of user logic.

High-speed digital (HSD) integrated circuits (ICs) may be used in Serializer/Deserializer (SerDes) systems. In such systems, a lossy channel may exist between the transmitter circuit and the receiver circuit and at high data rates the received data stream may be severely distorted and require reconstruction (equalization) before use.

Figure 2A:
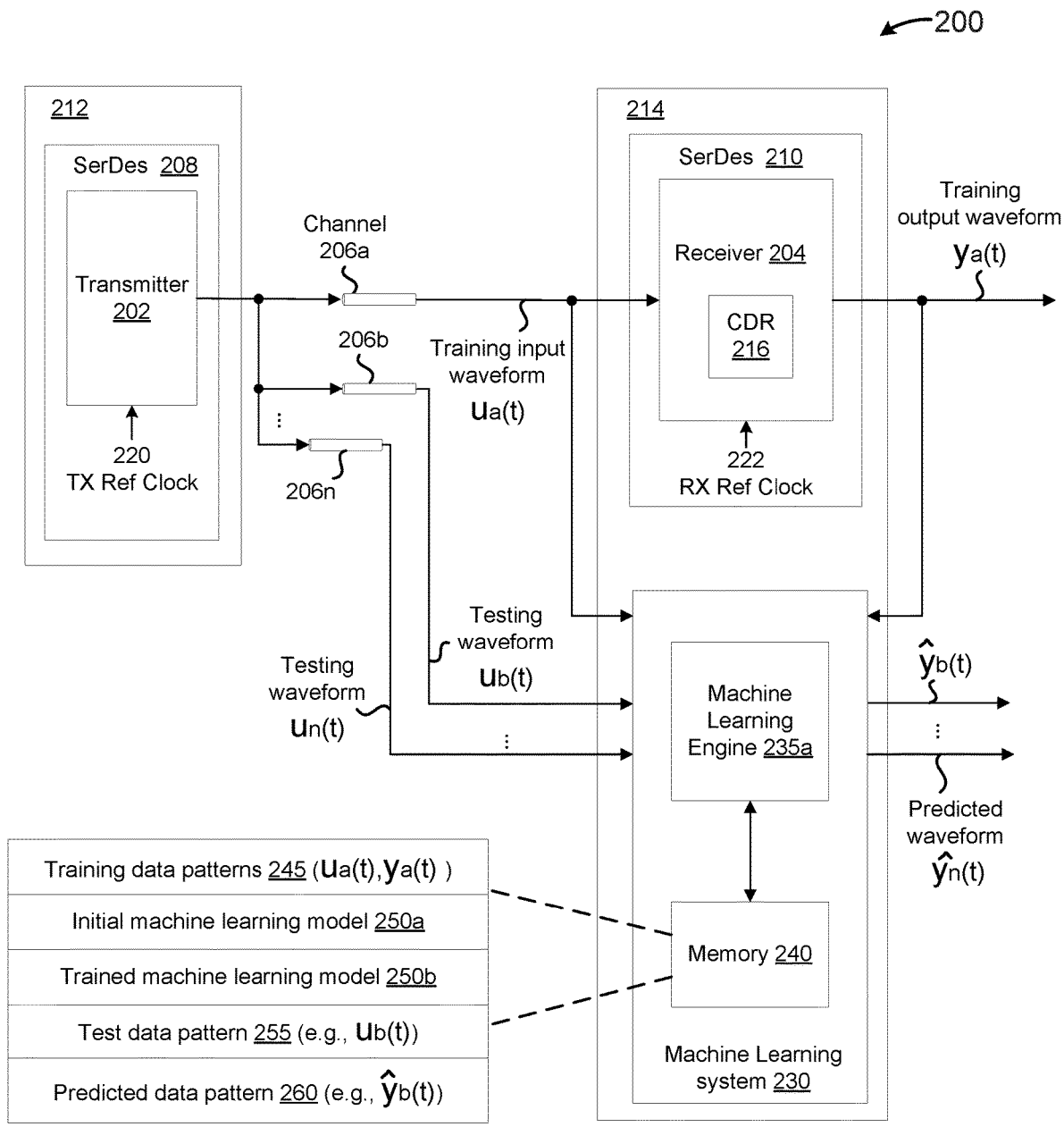
FIG. 2A depicts a communication system with an exemplary machine learning system implemented to predict transient waveforms at receiver's output.

FIG. 2A depicts a communication system with an exemplary machine learning system implemented to predict transient waveforms at receiver's output. In this depicted example, a serial communication system 200 includes a transmitter 202 coupled to a receiver 204 over one or more transmission channels 206a-206n. The transmitter 202 may be part of a serializer-deserializer (SerDes) 208 and the SerDes 208 is disposed in an integrated circuit (IC) 212. The receiver 204 may also be part of a SerDes 210 and the SerDes 210 is disposed in an IC 214. The IC 214 also includes a machine learning system 230 configured to receive training waveforms and provide a trained machine learning model to predict waveforms at the receiver's output. Bathtub characterizations and eye diagrams may be then extracted from the predicted output waveforms.

The transmission channels 206a-206n may include printed circuit board (PCB) traces, vias, cables, connectors, decoupling capacitors, and the like. The transmitter 202 drives serial data onto the transmission channels 206a-206n using a digital baseband modulation technique. In general, the serial data is divided into symbols. The transmitter 202 converts each symbol into an analog voltage mapped to the symbol. The transmitter 202 couples the analog voltage generated from each symbol to the one of the transmission channels 206a-206n. In some embodiments, the transmitter 202 may use a binary non-return-to-zero (NRZ) modulation scheme. In binary NRZ, a symbol may be one bit of the serial data and two analog voltages may be used to represent each bit. In some examples, the transmitter 202 may use multi-level digital baseband modulation techniques, such as pulse amplitude modulation (PAM), where a symbol includes a plurality of bits of the serial data and more than two analog voltages may be used to represent each bit.

The receiver 204 may include a clock and data recovery (CDR) circuit 216. The receiver 204 receives an analog signal from the transmission channels 206a-206n. The transmission channels 206a-206n may degrade the signal quality of the transmitted analog signal. Channel insertion loss is a frequency-dependent degradation in signal power of the analog signal. When signals travel through a transmission channel, the high-frequency components of the analog signal may be attenuated more than the low-frequency components. In general, channel insertion loss may increase as frequency increases. Signal pulse energy in the analog signal may be spread from one symbol period to another during propagation on the transmission channels 206a-206n. The resulting distortion is known as inter-symbol interference (ISI). A continuous time linear equalizer (CTLE) and/or a decision feedback equalizer (DFE) may be used to mitigate the ISI.

The CDR circuit 216 operates to recover data and a clock from the analog signal. The receiver 204 provides the recovered data to physical coding sublayer (PCS) circuitry (not shown) in SerDes 210 for decoding and further processing. As illustrated in FIG. 2A, the transmitter 202 may use a transmitter reference clock 220, and the receiver 204 may use a receiver reference clock 222. In some embodiments, there may be a difference between the transmitter reference clock 220 and the receiver reference clock 222, which may be referred to as a frequency offset between the transmitter reference clock and the receiver reference clock 222. A frequency reference offset may exist when the transmitter reference clock 220 and the receiver reference clock 222 use independent clock sources (e.g., clock sources that are nominally but not exactly identical in frequency). In some embodiments, the frequency offset may be fixed (e.g., equal to a constant). In some embodiments, the frequency offset may not be fixed, for example, may be a periodic function of time.

In this depicted example, the machine learning system 230 is configured to predict transient waveforms, eye diagrams, and bathtub curves of CTLE and/or DFE output of the SerDes receiver 204 for any SerDes channels (e.g., channels 206a-206n). The machine learning system 230 includes a machine learning engine 235a (e.g., a processing engine) coupled to a memory 240 (e.g., through an interface circuitry). The memory 240 may be considered an example of computer readable storage media. The machine learning engine 235a is configured to execute program code accessed from memory 240.

In this depicted example, the system 200 (or the IC 214) is configured to have two phases. During a first phase, the system 200 (or the IC 214) is capable of performing machine learning using training data patterns 245. In this depicted example, the training data patterns 245 includes a training input waveform (e.g., waveform $u_a(t)$) received by the receiver 204 and the corresponding generated waveform (e.g., training output waveform $y_a(t)$) at the receiver's output. The training input waveform $u_a(t)$ and the generated waveform $y_a(t)$ may be transient waveforms extracted from on-die measurements or simulations at the receiver's input and output, respectively. The difference between the input waveform $u_a(t)$ and the generated waveform $y_a(t)$ contains all the receiver's analog front end and equalization information. The training data patterns 245 may be stored in memory 240.

The machine learning engine 235a is configured to perform machine learning (e.g., neural network training) using the training data patterns 245 to generate a trained machine learning model 250b. The trained machine learning model 250b may be able to predict millions of bits and generate high-correlation eye diagrams. In some embodiments, the trained machine learning model's complexity may be automatically adaptive according to the training data patterns 245. Due to channel loss, the current received bit may be impacted by the ISI from the previous bits.

In various embodiments, the machine learning engine 235a may be configured to perform operations to implement the Pearson Correlation Coefficient (PCC) algorithm to analyze the relationship among the current output, previous inputs, and previous outputs, and provide model order suggestions. A user may set a first PCC score to select how many previous inputs to be used in the neural network model. A user may also select a second PCC score to select how may previous outputs to be used in the neural network model. In some embodiments, the first PCC score may equal the second PCC score.

In various embodiments, the machine learning engine 235a may be then configured to perform operations to implement an initial machine learning model 250a. The initial machine learning model 250a may then use the model orders generated by PCC analysis to analyze the previous inputs and previous outputs to identify the different effects of previous inputs and then self-select how many previous inputs and previous outputs may be used to predict the current output according to PCC scores. The adaptive-ordered machine learning model may be then trained (by the training data patterns 245) to be a specific machine learning model 250b (e.g., with known model variables, nonlinear degree, etc.). The trained machine learning model 250b may then be stored in the memory 240 and be used by the machine learning engine 235a in a second phase. An exemplary simulated PCC score is described in further detail with reference to FIG. 3. An exemplary method to generate the trained machine learning model 250b is described in detail with reference to FIG. 4A.

When the trained machine learning model 250b is ready, in a second phase, the machine learning engine 235a may be then configured to perform operations to implement the trained machine learning model 250b to predict data patterns (e.g., transient waveform $\hat{y}_b(t)$) at the receiver's output via different channels and with different test data patterns. The test data pattern 255 includes one or more test waveforms (e.g., waveform $u_b(t)$~waveform $u_n(t)$). The test data pattern 255 may also include transient waveforms extracted from on-die measurements or simulations at the receiver's input. In this depicted example, the test data pattern 255 is also stored in memory 240. The machine learning engine 235a is then configured to retrieve the test data pattern 255 and apply the test data pattern 255 to the trained machine learning model 250b to generate predicted data pattern 260. The predicted data pattern 260 may include transient waveforms at the receiver's output. One or more software may be used to extract eye diagrams, and/or bit error rate (BER) bathtub characterizations from the predicted data pattern 260. The eye diagrams may include information about eye widths and eye heights. In some embodiments, the test data pattern 255 may be from the same pseudorandom binary sequence (PRBS) data set such that the training data patterns 245 and test data pattern 255 have the same random distribution features that would impact the prediction accuracy.

In some embodiments, the initial machine learning model 250a may include auto-regressive moving average external input based on neural networks (NNARMAX) model. The NNARMAX model may be used to mimic the CTLE mode of the receiver 204. By introducing the machine learning system 230, the machine learning model may be trained only once, predict transient waveforms, eye diagram, and bathtub curve of different data patterns over different channels may be rapidly precited while preserving substantial accuracy.

The memory 240 may include one or more physical memory devices such as, for example, a local memory and one or more bulk storage devices. Local memory refers to random access memory (RAM) or other non-persistent memory devices generally used during actual execution of the program code. A bulk storage device may be implemented as a hard disk drive (HDD), solid state drive (SSD), or other persistent data storage device. The machine learning system 230 may also include one or more cache memories (not shown) that provide temporary storage of at least some program codes in order to reduce the number of times program codes to be retrieved from the bulk storage device during execution. Although, in this depicted example, the training data patterns 245, the machine learning models (e.g., the initial machine learning model 250a and the trained machine learning model 250b), the test data pattern and the predicted data pattern 260 are all stored in the same memory 240, in some embodiments, part or all of the data patterns and/or the model may be stored in different data storages.

Figure 2B:
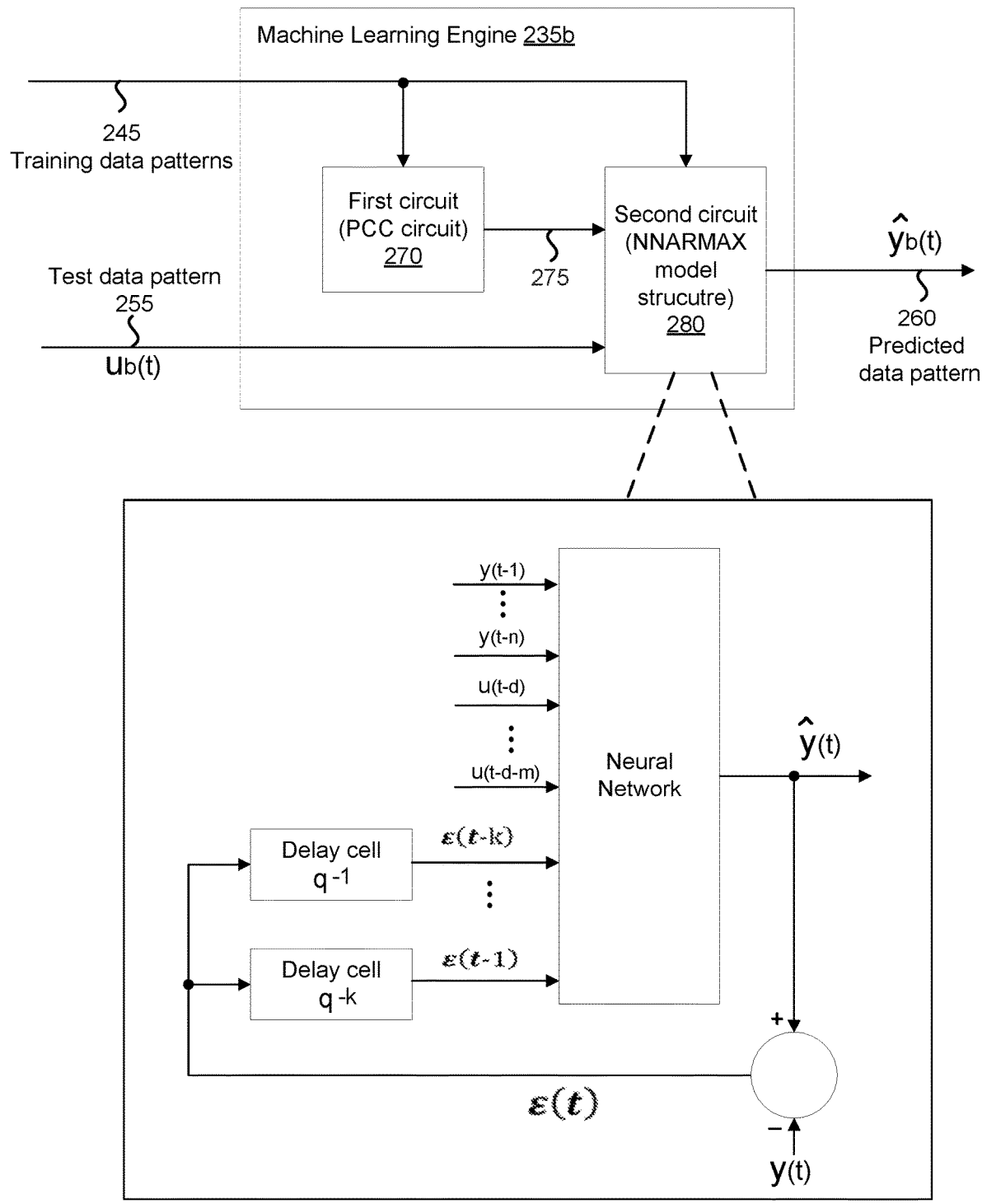
FIG. 2B depicts an exemplary hardware-implemented machine learning engine that may be used in the machine learning system.

FIG. 2B depicts an exemplary hardware-implemented machine learning engine that may be used in the machine learning system. In this depicted example, an exemplary hardware-implemented machine learning engine 235b may also be used to provide a trained machine learning model. The trained machine learning model is used to predict waveforms at the receiver's output. Bathtub characterizations and eye diagrams may be then extracted from the predicted output waveforms.

In this depicted example, the hardware-implemented machine learning engine 235b includes a first circuit 270. The first circuit 270 is configured to receive the training data patterns 245 from, for example, the memory 240 and generate a first signal 275. The training data patterns 245 includes a transient waveform (e.g., $u_a(t)$) received by the receiver 204 and a corresponding transient waveform (e.g., $y_a(t)$) generated at the receiver's output. The first signal 275 contains information about relationships among a current output at the receiver's output, previous inputs received by the receiver 204, and previous outputs at the receiver's output. The first signal 275 may also contain information about the best order to be used to, for example, a nonlinear model structure. The best order of the nonlinear model structure means how many previous inputs and previous outputs are considered to predict a current output. In this depicted example, the first circuit 270 includes a Pearson Correlation Coefficient (PCC) analysis and order selection circuit that configured to generate the first signal 275.

The machine learning engine 235b also includes a second circuit 280. The second circuit 280 is used to implement the nonlinear model. In this depicted example, the nonlinear model includes an auto-regressive moving average external input based on neural network (NNARMAX) model. In some embodiments, the nonlinear model may include other system identification models to advantageously reduce the training time.

The second circuit 280 is coupled to the first circuit 270 to receive the first signal 275. The second circuit 280 also receives the training data patterns 245. When the NNARMAX model in the second circuit 280 is trained, the second circuit 280 is configured to receive the test data pattern 255 and generate a corresponding output data pattern 260. The generated output data pattern 260 includes the predicted output data pattern at the receiver's output. Then, the eye diagram and bathtub curve may be extracted from the predicted output data pattern 260. In some embodiments, the training data patterns 245 may include transient waveforms extracted from on-die measurements or simulations at the receiver's input and output, respectively.

An exemplary NNARMAX model structure is also shown in FIG. 2B. The NNARMAX structure is given by:

$$\hat{y}(t)=f(y(t-1),y(t-2),\ldots,y(t-n),u(t-d),u(t-d-m),\varepsilon(t-1),\ldots,\varepsilon(t-k))$$

where $\hat{y}(t)$ is the predicted output at time t, u is the input, and ε is the residual between the observed value y(t) and the predicted output $\hat{y}(t)$. d is the delay between the input and output, n is the order of the output, m is the order of the input, and k is the order of the residual. A predictor of the NNARMAX model may have feedback when regressors are trained. The prediction error may depend on the predicted output from the model and corresponding feedbacks. By introducing the machine learning system, the machine learning model may be trained only once, predict transient waveforms, eye diagram, and bathtub curve of different data patterns over different channels may be rapidly predicted while preserving substantial accuracy.

Figure 3:
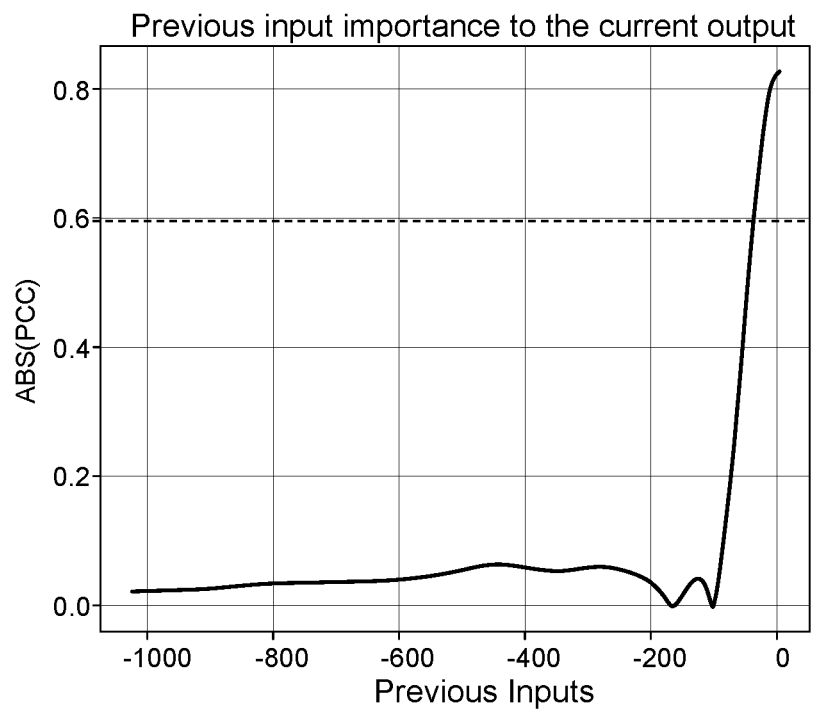
FIG. 3 depicts exemplary calculated Pearson Correlation Coefficient (PCC) scores used by the machine learning system.
Figure 3:
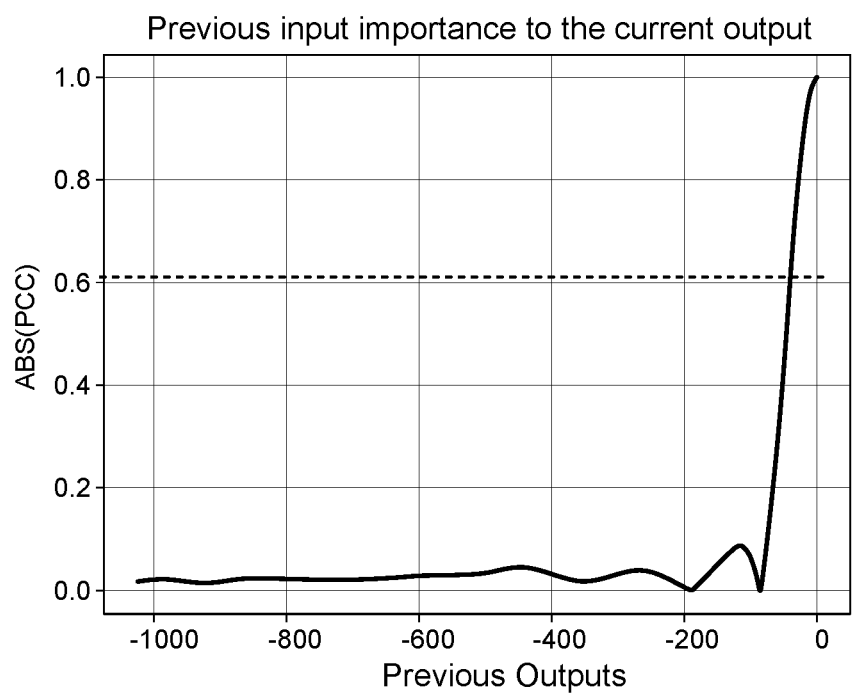

FIG. 3 depicts exemplary calculated Pearson Correlation Coefficient (PCC) scores used by the machine learning system. Due to channel loss, the current received bit may be impacted by the ISI from the previous bits. PCC is used to analyze the relationship among the current output, previous inputs, and previous outputs. PCC is a measure of the correlation between two variables, and the formula is shown as:

$$\rho_{X,Y} = \frac{cov(X, Y)}{\sigma_x \sigma_y}$$

wherein cov is the covariance, $\sigma_x$ is the standard deviation of X, and $\sigma_y$ is the standard deviation of Y. As shown in FIG. 3, x axis is the previous input data index and previous output data index, respectively, the y axis is the PCC score. The higher the PCC score, the more closely the previous input/output may be related to the current output (e.g., target value). For example, as shown in FIG. 3, if a threshold is set to 0.6, about 40 previous inputs and 45 previous outputs are most related to the current output.

Figure 4A:
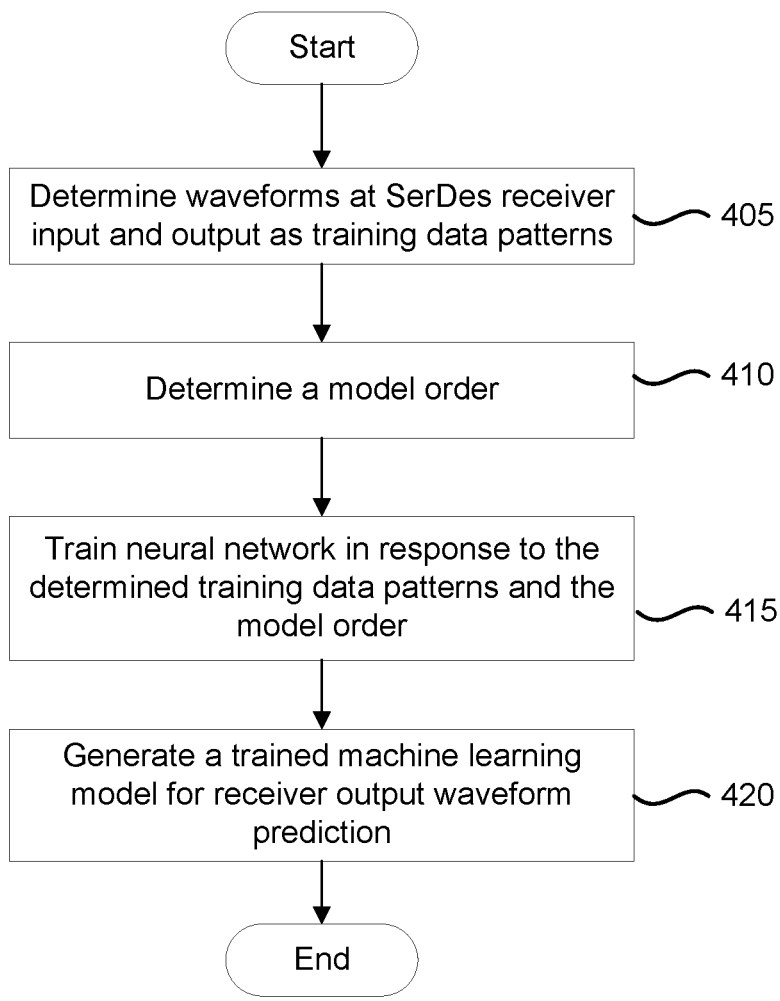
FIG. 4A depicts a flow chart of an exemplary method to generate a neural network model.

FIG. 4A depicts a flow chart of an exemplary method to generate a machine learning model. A method 400A of generating a machine learning model includes, at 405, determining training data patterns (e.g., waveform $u_a(t)$ at SerDes receiver's input and waveform $y_a(t)$ at SerDes receiver's output). The waveforms $u_a(t)$ and $y_a(t)$ may be transient waveforms extracted from on-die measurements or simulations at the receiver's input and output, respectively. The method 400A also includes, at 410, determining a model order (e.g., signal 275) by, for example, the PCC analysis and order selection circuit 270.

The method 400A also includes, at 415, training a neural network of a machine learning model (e.g., the model 280) in response to the determined training data patterns and the model order. For example, the machine learning engine 235a discussed with reference to FIG. 2A and the machine learning engine 235b discussed with reference to FIG. 2B may be used to train the neural network. The method 400A also includes, at 415, generating the trained machine learning model (e.g., the trained machine learning model 250b or the second circuit 280 with model structure) for the receiver's output waveform prediction. By providing the trained machine learning model, transient waveforms, eye diagram, and bathtub curve of different data patterns over different channels at the receiver's output may be accurately predicted.

Figure 4B:
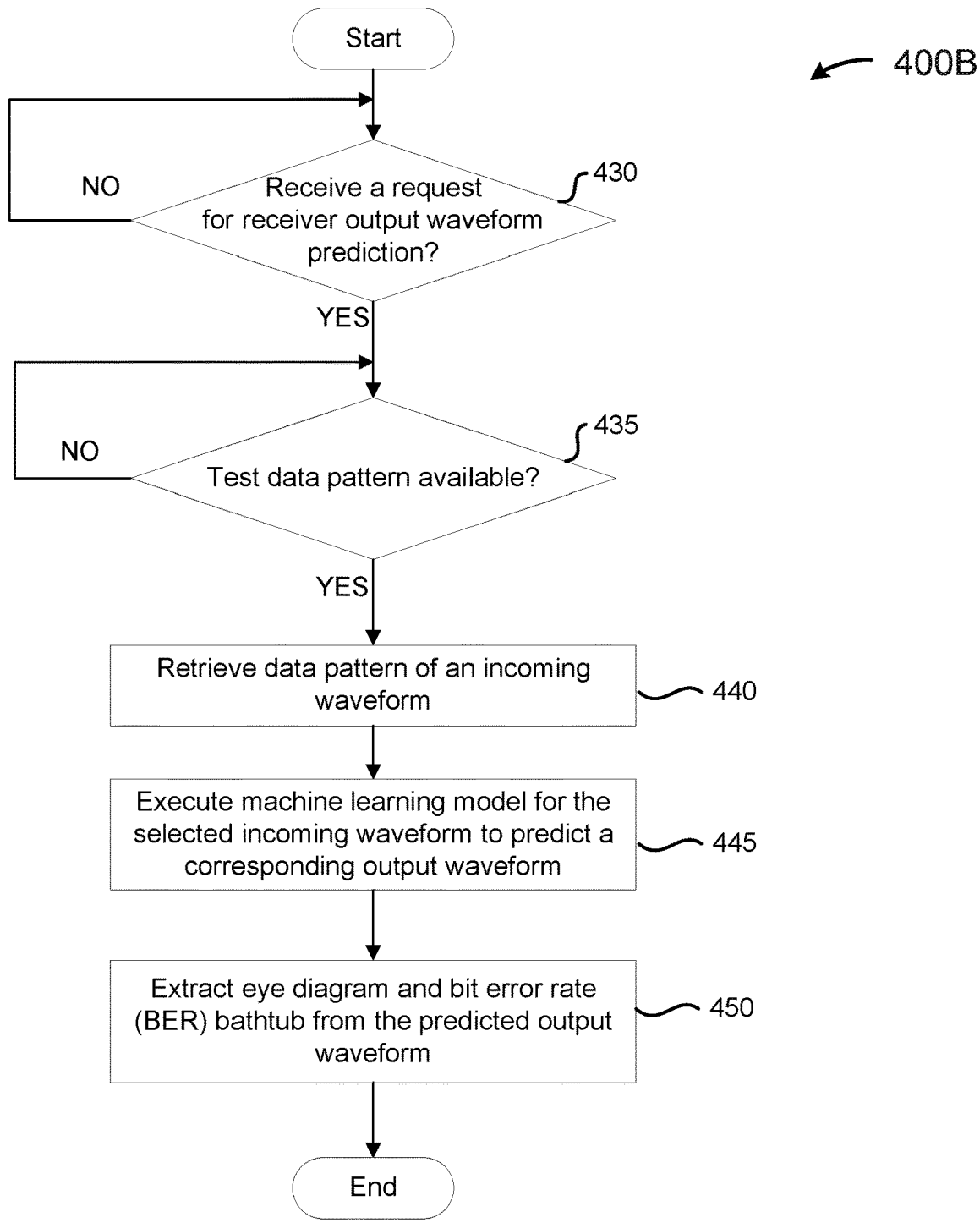
FIG. 4B depicts a flow chart of an exemplary method to predict waveform at a receiver's output.

FIG. 4B depicts a flow chart of an exemplary method to predict waveform at a receiver's output. An exemplary method 400B to predict waveform (e.g., waveform $\hat{y}_b(t)$) ~$\hat{y}_n(t)$)) at a receiver's output is discussed. The method 400B includes, at 430, determining, for example, by the machine learning engine 235a, whether a request to predict a receiver's output waveform is received. If not, the method 400B may continue to loop as shown. If yes, then, at 435, the machine learning engine 235a determines whether test data patterns (e.g., test data pattern 255) related to one or more test waveforms (e.g., waveform $u_b(t)$~$u_n(t)$) are available. If not, the method 400B may continue to loop as shown. In some embodiments, the machine learning engine 235a may be configured to generate a signal to indicate that the test data patterns are not available. If yes, then, at 440, the machine learning engine 235a retrieves a test data pattern related to a test waveform (e.g., waveform $u_b(t)$).

The method 400B also includes, at 445, executing the machine learning model 250 for the retrieved data pattern of the test waveform and generate a predicted corresponding output waveform (e.g., waveform $\hat{y}_b(t)$). In some embodiments, the method 400B may also include, at 450, extracting eye diagram and bit error rate (BER) bathtub curve from the predicted output waveform. After modeling, the machine learning model may provide high-precision transient waveforms, eye diagrams prediction, and also a high-correlation eye shape prediction.

Figure 5:
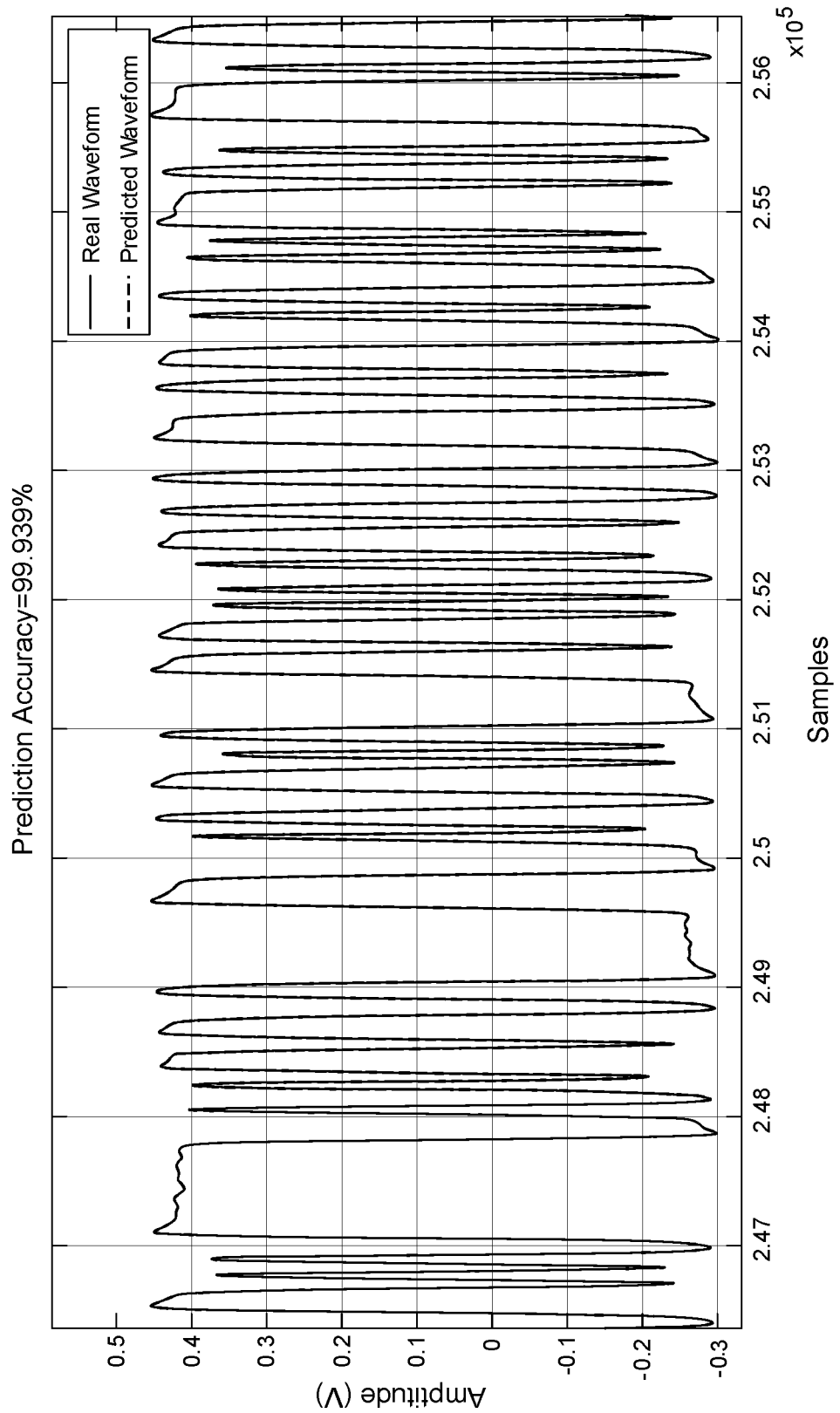
FIG. 5 depicts a simulation result showing an actual output waveform and a predicted output predicted waveform at the receiver's output.

FIG. 5 depicts a simulation result showing an actual output waveform and a predicted output predicted waveform at the receiver's output. A behavioral model (e.g., the adaptive-ordered NNARMAX model) for the SerDes receiver 204 is built. In this simulation, the data rate is 25.78 Gbps, and the adaptive-ordered NNARMAX model is trained over a training channel (e.g., channel 206a) with RPBS15 and tested with PRBS23 and PRBS 31 over test channels (e.g., channel 206b-206n). The training and testing data configuration are shown in TABLE 1. Testing 1 is for an under-equalization scenario with high channel loss and Testing 2 is for an over-equalization with low channel loss.

TABLE 1

| | Training | Testing 1 | Testing 2 |
|---|---|---|---|
| Data Rate | 25.78 Gbps | 25.78 Gbps | 25.78 Gbps |
| Channel Insertion Loss | medium | high | low |
| Data Pattern | PRBS 15 | PRBS 23 | PRBS 31 |
| Bits | $2^{15}$ | $2^{15}$ | $2^{15}$ |

The adaptive-ordered NNARMAX model shows high capabilities to track nonlinear behavior of the CTLE and high-precision accuracies over testing channels. All the test cases are from different channels and different data patterns. The transient waveforms prediction accuracies are above 99%. In the tests. the adaptive-ordered NNARMAX model also provides high-correlation predictions for all the cases, as shown in FIG. 5.

Figure 6:
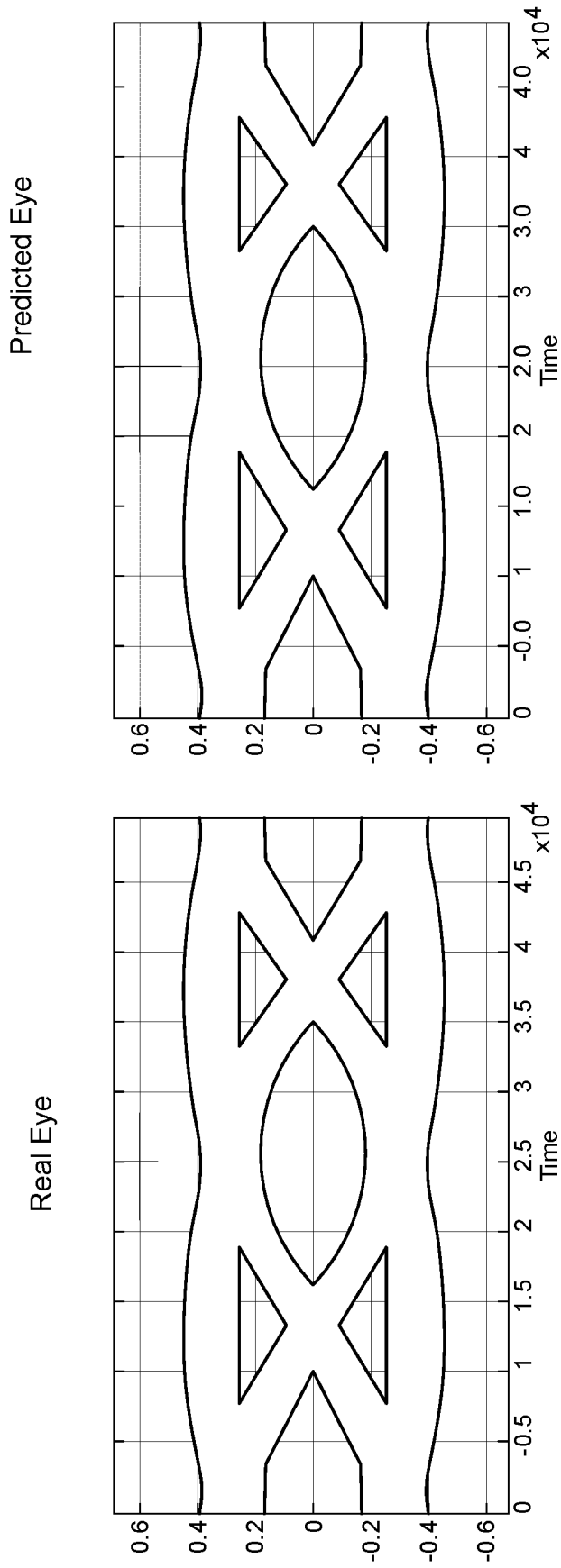
FIG. 6 depicts an actual eye diagram extracted from the actual output waveform and a predicted eye diagram extracted from the predicted output waveform.

FIG. 6 depicts an actual eye diagram extracted from the actual output waveform and a predicted eye diagram extracted from the predicted output waveform. An eye diagram is very important for SerDes applications because an eye diagram presents the details of the eye opening margin. It's also important to obtain the eye diagram for correct eye height and eye width measurements. Based on millions of bits' transient waveforms' prediction, the eye diagrams are generated. FIG. 6 shows side by side comparison of eye diagrams from the actual waveforms and the predicted waveforms. In this case, the channel loss is higher than CTLE relative gain, and the predicted eye diagram shows under-equation.

The eye margin prediction are shown in Table 2. Regarding the simulation speed, the adaptive-ordered NNARMAX model may predict 30K bits in 5 seconds.

TABLE 2

| | Testing 1 | | Testing 2 | |
|---|---|---|---|---|
| | Eye width (ns) | Eye height (ns) | Eye width (ns) | Eye height (ns) |
| Actual | 1.17 | 0.54 | 0.75 | 0.25 |
| Predicted | 1.18 | 0.55 | 0.75 | 0.26 |

All the test cases are from different channels and different data patterns. The eye height and eye width prediction accuracies are also above 96%. The adaptive-ordered NNARMAX model also provides a high-correlation eye shape prediction. For the simulation speed, the adaptive-ordered NNARMAX model is faster than other machine learning models.

Figure 7A:
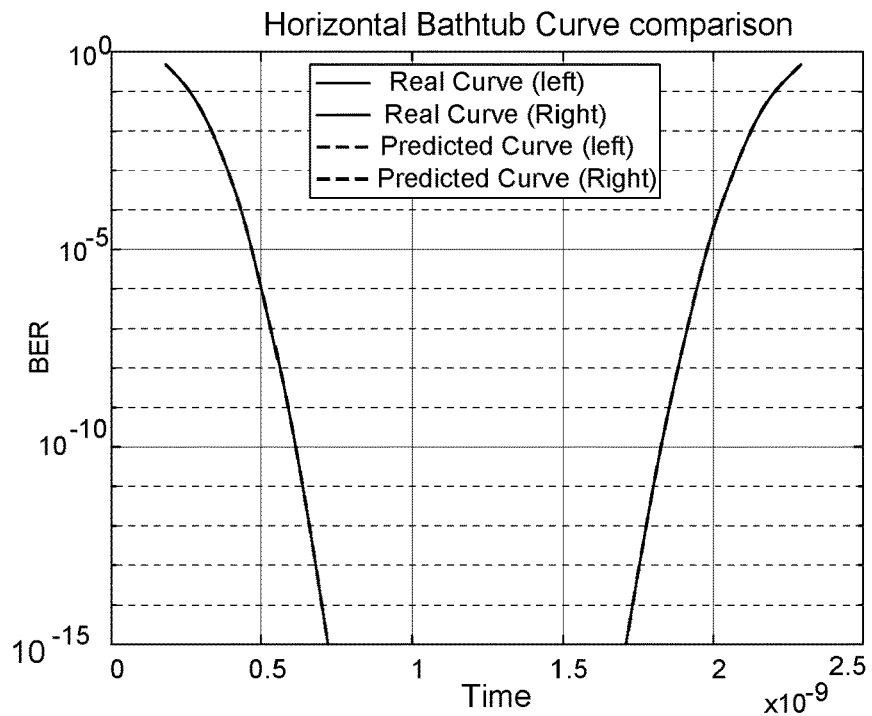
FIGS. 7A-7B depict actual bathtub curves and predicted bathtub curves horizontally and vertically.
Figure 7B:
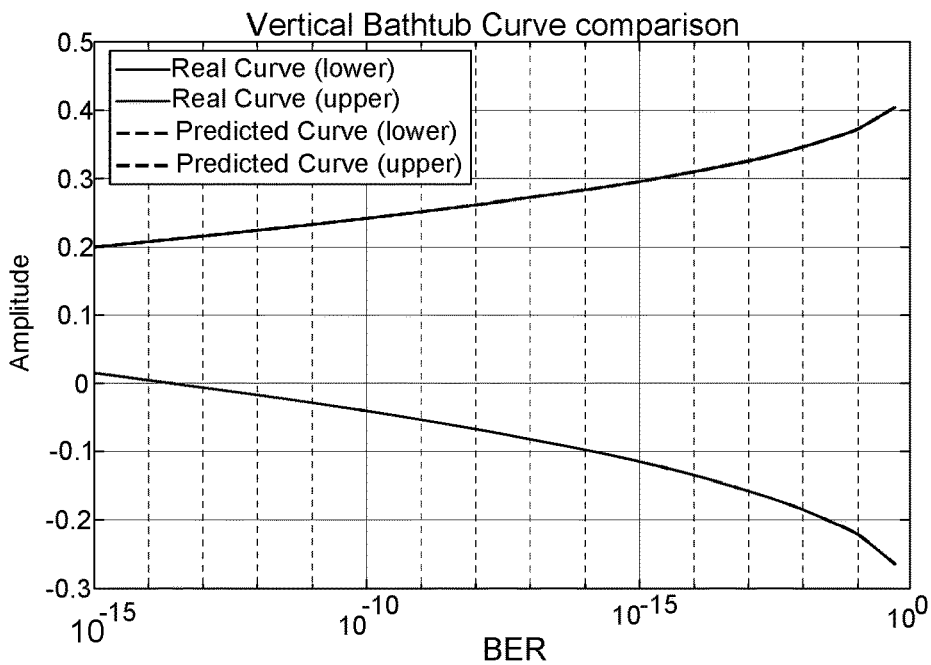

FIGS. 7A-7B depicts actual bathtub curves and predicted bathtub curves compared horizontally and vertically, respectively. The bathtub prediction is based on the eye diagram constructed from long enough transient waveform. The machine learning model complexity determines the model prediction/simulation time. And consequently, the total length of the transient waveform prediction may be obtained with reasonable simulation time. The adaptive-ordered NNARMAX model can predict one million bits within 10 seconds. Thus, a faster bathtub prediction may be obtained. The BER bathtub prediction also shows a high correlation with the actual receiver.

In this depicted example, the machine learning system 230 is arranged on the same integrated circuit 214 (e.g., field programmable gate array FPGA) with the SerDes 210. In another embodiment, the machine learning system 230 may be arranged on the same SerDes 210 with the receiver 204. In other embodiments, the machine learning system 230 may be implemented in a different IC to perform the prediction of the output of the receiver 204.

In some embodiments, the machine learning system 230 may be implemented as hard block fixed circuitry. For example, an application specific integrated circuit (ASIC) may provide a machine learning system for faster prediction of the output of the receiver with customized hardware circuitry. In some embodiments, when the machine learning system 230 is implemented as hard block fixed circuitry, different parts (e.g., the first circuit 270, the second circuit 280, the memory 240) of the machine learning system 230 may be implemented in the same or different integrated circuits.

In some embodiments, some or all of the functions of the machine learning system 230 may be implemented in a processor (e.g., the machine learning engine 235a) that is configured to execute a set of instructions stored in a data store to control the training and prediction. The processor may be arranged on the same integrated circuit, which may be an FPGA with the receiver 204. For example, the machine learning engine 235a and the data store may be implemented in a programmable logic block of a system-on-chip (SOC) or implemented in a hard block using fixed circuitry of the SOC, and the receiver 204 may be implemented in another hard block using, for example, fixed circuitry of the SOC.

Figure 8:
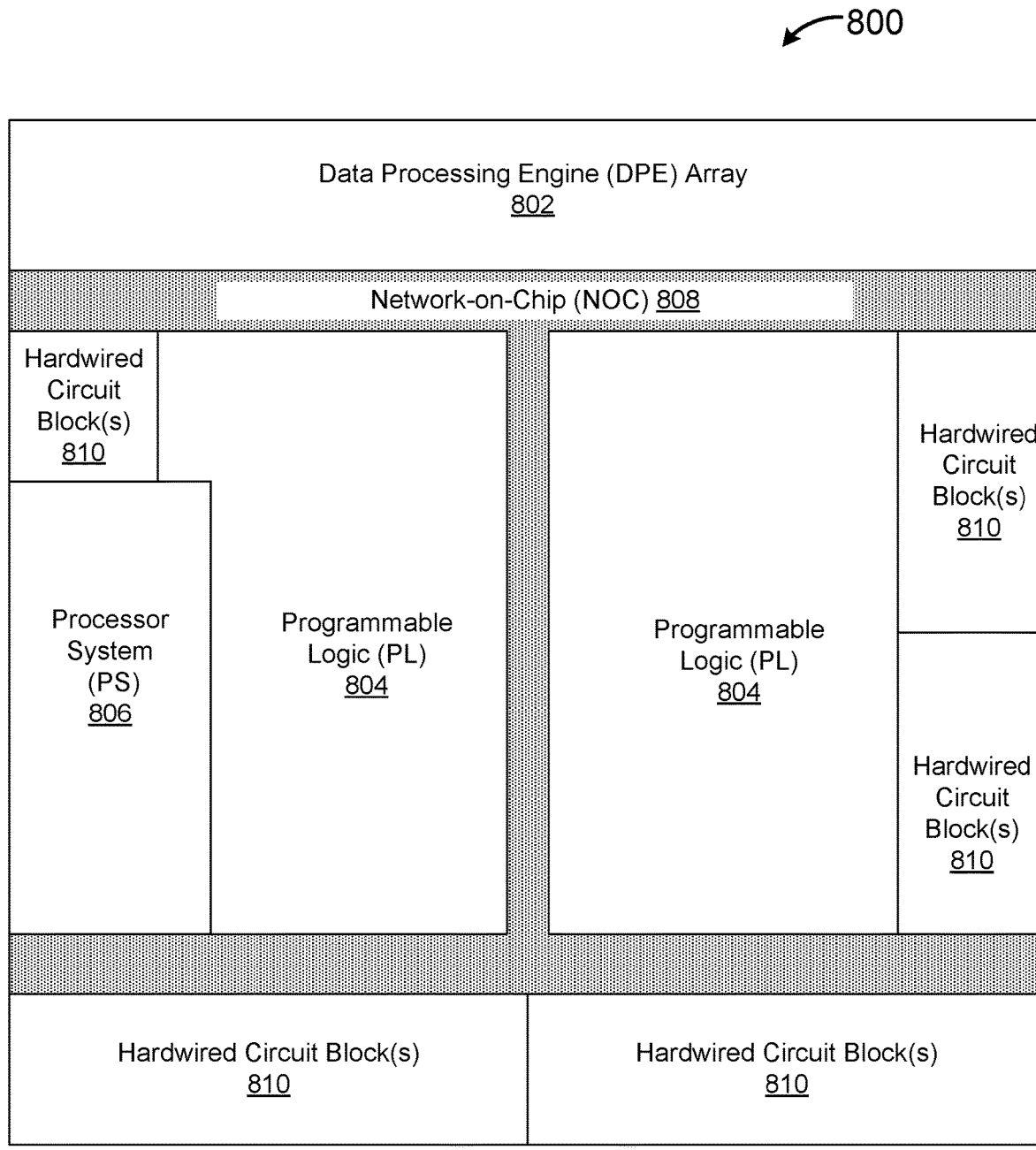
FIG. 8 depicts an exemplary system-on-chip (SOC) on which the disclosed circuits and processes may be implemented.

FIG. 8 depicts an exemplary system-on-chip (SOC) on which the disclosed circuits and processes may be implemented. SOC 800 is an example of a programmable IC and an integrated programmable device platform. In the example of FIG. 8, the various, different subsystems or regions of the SOC 800 illustrated may be implemented on a single die provided within a single integrated package. In other examples, the different subsystems may be implemented on a plurality of interconnected dies provided as a single, integrated package.

In the example, the SOC 800 includes a plurality of regions having circuitry with different functionalities. In the example, the SOC 800 optionally includes a data processing engine (DPE) array 802. SOC 800 includes programmable logic (PL) regions 804 (hereafter PL region(s) or PL), a processing system (PS) 806, a Network-on-Chip (NOC) 808, and one or more hardwired circuit blocks 810. DPE array 802 is implemented as a plurality of interconnected, hardwired, and programmable processors having an interface to the other regions of the SOC 800.

PL 804 is circuitry that may be programmed to perform specified functions. As an example, PL 804 may be implemented as a field programmable gate array type of circuitry. PL 804 can include an array of programmable circuit blocks. Examples of programmable circuit blocks within PL 804 include, but are not limited to, configurable logic blocks (CLBs), dedicated random access memory blocks (BRAM and/or UltraRAM or URAM), digital signal processing blocks (DSPs), clock managers, and/or delay lock loops (DLLs).

Each programmable circuit block within PL 804 typically includes both programmable interconnect circuitry and programmable logic circuitry. The programmable interconnect circuitry typically includes a large number of interconnect wires of varying lengths interconnected by programmable interconnect points (PIPs). Typically, the interconnect wires are configured (e.g., on a per wire basis) to provide connectivity on a per-bit basis (e.g., where each wire conveys a single bit of information). The programmable logic circuitry implements the logic of a user design using programmable elements that may include, for example, look-up tables, registers, arithmetic logic, and so forth. The programmable interconnect and programmable logic circuitries may be programmed by loading configuration data into internal configuration memory cells that define how the programmable elements are configured and operate.

The PS 806 is implemented as hardwired circuitry that is fabricated as part of the SOC 800. The PS 806 may be implemented as, or include, any of a variety of different processor types each capable of executing program code. For example, PS 806 may be implemented as an individual processor, e.g., a single core capable of executing program code. In another example, PS 806 may be implemented as a multicore processor. In still another example, PS 806 may include one or more cores, modules, co-processors, interfaces, and/or other resources. PS 806 may be implemented using any of a variety of different types of architectures. Example architectures that may be used to implement PS 806 may include, but are not limited to, an ARM processor architecture, an x86 processor architecture, a GPU architecture, a mobile processor architecture, a DSP architecture, or other suitable architecture that is capable of executing computer-readable instructions or program code.

NOC 808 includes an interconnecting network for sharing data between endpoint circuits in SOC 800. The endpoint circuits can be disposed in DPE array 802, PL regions 804, PS 806, and/or in hardwired circuit blocks 810. NOC 808 can include high-speed data paths with dedicated switching. In an example, NOC 808 includes horizontal paths, vertical paths, or both horizontal and vertical paths. The arrangement and number of regions shown in FIG. 8 is merely an example. The NOC 808 is an example of the common infrastructure that is available within the SOC 800 to connect selected components and/or subsystems.

NOC 808 provides connectivity to PL 804, PS 806, and to selected ones of the hardwired circuit blocks 810. NOC 808 is programmable. In the case of a programmable NOC used with other programmable circuitry, the nets that are to be routed through NOC 808 are unknown until a user circuit design is created for implementation within the SOC 800. NOC 808 may be programmed by loading configuration data into internal configuration registers that define how elements within NOC 808 such as switches and interfaces are configured and operate to pass data from switch to switch and among the NOC interfaces.

NOC 808 is fabricated as part of the SOC 800 and while not physically modifiable, may be programmed to establish connectivity between different master circuits and different slave circuits of a user circuit design. NOC 808, for example, may include a plurality of programmable switches that are capable of establishing packet switched network connecting user specified master circuits and slave circuits. In this regard, NOC 808 is capable of adapting to different circuit designs, where each different circuit design has different combinations of master circuits and slave circuits implemented at different locations in the SOC 800 that may be coupled by NOC 808. NOC 808 may be programmed to route data, e.g., application data and/or configuration data, among the master and slave circuits of the user circuit design. For example, NOC 808 may be programmed to couple different user-specified circuitry implemented within PL 804 with PS 806, and/or DPE array 802, with different hardwired circuit blocks, and/or with different circuits and/or systems external to the SOC 800.

The hardwired circuit blocks 810 may include input/output (I/O) blocks, and/or transceivers for sending and receiving signals to circuits and/or systems external to SOC 800, memory controllers, or the like. Examples of different I/O blocks may include single-ended and pseudo differential I/Os and high-speed differentially clocked transceivers. Further, the hardwired circuit blocks 810 may be implemented to perform specific functions. Examples of hardwired circuit blocks 810 include, but are not limited to, cryptographic engines, digital-to-analog converters, analog-to-digital converters, and the like. The hardwired circuit blocks 810 within the SOC 800 may be referred to herein from time-to-time as application-specific blocks.

In the example of FIG. 8, PL 804 is shown in two separate regions. In another example, PL 804 may be implemented as a unified region of programmable circuitry. In still another example, PL 804 may be implemented as more than two different regions of programmable circuitry. The particular organization of PL 804 is not intended as a limitation. In this regard, SOC 800 includes one or more PL regions 804, PS 806, and NOC 808. DPE array 802 may be optionally included.

In other example implementations, the SOC 800 may include two or more DPE arrays 802 located in different regions of the IC. In still other examples, the SOC 800 may be implemented as a multi-die IC. In that case, each subsystem may be implemented on a different die. The different dies may be communicatively linked using any of a variety of available multi-die IC technologies such stacking the dies side-by-side on an interposer, using a stacked-die architecture where the IC is implemented as a Multi-Chip Module (MCM), or the like. In the multi-die IC example, it should be appreciated that each die may include single subsystem, two or more subsystems, a subsystem and another partial subsystem, or any combination thereof.

A programmable integrated circuit (IC) refers to a type of device that includes programmable logic. An example of a programmable device or IC is a field programmable gate array (FPGA). An FPGA is characterized by the inclusion of programmable circuit blocks. Examples of programmable circuit blocks include, but are not limited to, input/output blocks (IOBs), configurable logic blocks (CLBs), dedicated random access memory blocks (BRAM), digital signal processing blocks (DSPs), processors, clock managers, and delay lock loops (DLLs). Modern programmable ICs have evolved to include programmable logic in combination with one or more other subsystems. For example, some programmable ICs have evolved into System-on-Chips or "SOCs" that include both programmable logic and a hardwired processor. Other varieties of programmable ICs include additional and/or different subsystems.

Although various embodiments may be implemented using reconfigurable programmable logic blocks (e.g., FPGA), other embodiments may be implemented in fixed instantiations (e.g., ASIC), or combined in a single integrated circuit (e.g., SOC) with programmable logic. While dedicated hard block circuitry in an ASIC implementation may not be reconfigurable once instantiated in an integrated circuit, for example, an ASIC implementation may, in some implementations, provide for a minimized platform with respect to, for example, power consumption and/or die area.

Although various embodiments have been described with reference to the figures, other embodiments are possible. For example, in some embodiments, the modeling method may be applied to both pre-silicon circuit modeling simulations and post-silicon validation on-die measurement.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a fixed hardware processor; and methods can be performed by a programmable processor executing a program of instructions to perform functions of various embodiments by operating on input data and generating an output. Some embodiments may be implemented advantageously in one or more computer programs that are executable on a programmable system including at least one processor coupled to receive data and instructions from, and to transmit data and instructions to, a data store, at least one input, and/or at least one output. A data store may include one or more registers or memory locations in, for example, a memory space. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other units suitable for use in a computing environment.

In various embodiments, a computer system may include non-transitory memory. The memory may be connected to the one or more processors, which may be configured for storing data and computer readable instructions, including processor executable program instructions. The data and computer readable instructions may be accessible to the one or more processors. The processor executable program instructions, when executed by the one or more processors, may cause the one or more processors to perform various operations.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A system comprising:
a processor and memory configured to:
training a machine learning (ML) model to correlate input waveforms applied to a receiver to corresponding output waveforms of the receiver, including using a Pearson Correlation Coefficient (PCC) algorithm to select a number of prior inputs to the ML model and a number of prior outputs of the ML model to use in predicting a current output of the ML model; and
provide test data patterns to the trained ML model to cause the trained ML model to predict output waveforms that include predicted transient waveforms imparted by the receiver.

2. The system of claim 1, wherein the processor and memory are further configured to:
select a first PCC score to determine the number of prior inputs to use; and
select a second PCC score to determine the number of prior outputs to use.

3. The system of claim 1, wherein the ML model comprises an adaptive-ordered auto-regressive moving average external input based on neural networks (NNARMAX) model.

4. The system of claim 3, wherein the processor and memory are further configured to:
select a first PCC score to determine the number of prior inputs to use; and
select a second PCC score to determine the number of prior outputs to use.

5. The system of claim 1, wherein the processor and memory are further configured to:
extract predicted bit error rate (BER) bathtub characterizations of the receiver from the predicted output waveforms.

6. The system of claim 1, wherein the processor and memory are further configured to:
extracting predicted eye diagram characterizations of the receiver from the predicted output waveforms.

7. The system of claim 1, wherein the input waveforms and the corresponding output waveforms used to train the ML model comprise transient waveforms extracted from on on-die measurements of the receiver.

8. The system of claim 1, wherein the waveforms and the corresponding output waveforms used to train the ML model comprise transient waveforms extracted from simulations of the receiver.

9. A method comprising:
training a machine learning (ML) model to correlate input waveforms applied to a receiver to corresponding output waveforms of the receiver, including using a Pearson Correlation Coefficient (PCC) algorithm to select a number of prior inputs to the ML model and a number of prior outputs of the ML model to use in predicting a current output of the ML model; and
providing test data patterns to the trained ML model to cause the trained ML model to predict output waveforms that include predicted transient waveforms imparted by the receiver.

10. The method of claim 9, further comprising:
selecting a first PCC score to determine the number of prior inputs to use; and
selecting a second PCC score to determine the number of prior outputs to use.

11. The method of claim 9, further comprising:
extracting predicted eye diagram characterizations of the receiver from the predicted output waveforms.

12. The method of claim 9, wherein the input waveforms and the corresponding output waveforms used to train the ML model comprise transient waveforms extracted from on-die measurements of the receiver.

13. The method of claim 9, further comprising:
extracting predicted bit error rate (BER) bathtub characterizations of the receiver from the predicted output waveforms.

14. The method of claim 9, wherein the input waveforms and the corresponding output waveforms used to train the ML model comprise transient waveforms extracted from simulations of the receiver.

15. The method of claim 9, wherein the ML model comprises an adaptive-ordered auto-regressive moving average external input based on neural networks (NNARMAX) model.

16. An integrated circuit (IC) device, comprising:
machine learning (ML) circuitry; and
training circuitry configured to train the ML circuitry to correlate input waveforms applied to a receiver to corresponding output waveforms of the receiver, including using a Pearson Correlation Coefficient (PCC) algorithm to select a number of prior inputs to the ML circuitry and a number of prior outputs of the ML circuitry to use in predicting a current output of the ML circuitry;
wherein the ML circuitry, when trained, is configured to predict output waveforms that include test data patterns and predicted transient waveforms imparted by the receiver based on the test data patterns provided to the ML circuitry.

17. The device of claim 16, wherein the training circuitry comprises circuitry configured to implement the PCC algorithm.

18. The IC device of claim 16, wherein the ML circuitry comprises auto-regressive moving average external input based on neural network (NNARMAX) circuitry.

19. The IC device of claim 16, wherein the input waveforms and the corresponding output waveforms used to train the ML circuitry comprise transient waveforms extracted from on on-die measurements of the receiver.

20. The IC device of claim 16, wherein the input waveforms and the corresponding output waveforms used to train the ML circuitry comprise transient waveforms extracted from simulations of the receiver.

\* \* \* \* \*